(12) United States Patent
Minor et al.

(10) Patent No.: US 8,228,589 B2
(45) Date of Patent: Jul. 24, 2012

(54) MULTI-PURPOSE PERISCOPE WITH DISPLAY AND OVERLAY CAPABILITIES

(75) Inventors: Jeffrey Wayne Minor, Lake Orion, MI (US); Henry Clarence Davies, Orion, MI (US); Edward Charles Schwartz, Rochester, MI (US); Michael James Klingensmith, Macomb, MI (US)

(73) Assignee: Oasis Advanced Engineering, Inc., Auburn Hills, MI (US)

( * ) Notice: Subject to any disclaimer, the term of this patent is extended or adjusted under 35 U.S.C. 154(b) by 0 days.

(21) Appl. No.: 12/799,059

(22) Filed: Apr. 17, 2010

(65) Prior Publication Data

US 2010/0202036 A1    Aug. 12, 2010

Related U.S. Application Data

(62) Division of application No. 11/947,682, filed on Nov. 29, 2007, now Pat. No. 7,719,749.

(51) Int. Cl.
*G02F 1/153* (2006.01)

(52) U.S. Cl. .......................... 359/267; 359/402

(58) Field of Classification Search .................... 359/267
See application file for complete search history.

(56) References Cited

U.S. PATENT DOCUMENTS

| | | | |
|---|---|---|---|
| 2,361,050 A | 10/1944 | Paddock | |
| 3,692,388 A | 9/1972 | Hall, Jr. et al. | |
| 4,149,778 A * | 4/1979 | Tausch | 359/857 |
| 4,672,435 A | 6/1987 | Gluck | |
| 5,134,519 A * | 7/1992 | Abele et al. | 359/405 |
| 5,691,789 A | 11/1997 | Li | |
| 5,695,682 A | 12/1997 | Doane | |
| 5,982,536 A | 11/1999 | Swan | |
| 6,055,098 A * | 4/2000 | Lett | 359/402 |
| 6,359,673 B1 | 3/2002 | Stephenson | |
| 6,369,868 B1 | 4/2002 | Fan | |
| 6,630,974 B2 | 10/2003 | Galabova | |
| 6,633,354 B2 | 10/2003 | Li | |
| 6,674,504 B1 | 1/2004 | Li | |
| 6,710,823 B2 | 3/2004 | Faris | |
| 6,844,980 B2 | 1/2005 | He | |
| 7,056,119 B2 | 6/2006 | Cabato | |
| 2003/0129567 A1 | 7/2003 | Cabato | |
| 2005/0007506 A1 | 1/2005 | Faris | |
| 2005/0057701 A1 | 3/2005 | Weiss | |

* cited by examiner

*Primary Examiner* — James Jones
(74) *Attorney, Agent, or Firm* — Raggio & Dinnin, P.C.

(57) ABSTRACT

A periscope that is switchable between the normal optical view of the outside, a display view, and an overlay view in which the outside view and display view are combined. The switching element is an electronically switchable mirror with primarily reflective, primarily transparent, and intermediate states, depending on the application of electrical potentials.

21 Claims, 13 Drawing Sheets

MULTI-PURPOSE PERISCOPE WITH DISPLAY AND OVERLAY CAPABILITIES

CROSS-REFERENCE TO RELATED APPLICATIONS

This is a divisional of application Ser. No. 11/947,682, filed Nov. 29, 2007 now U.S. Pat. No. 7,719,749.

FEDERALLY SPONSORED RESEARCH

The US Government has Government Purpose Rights to portions of this invention.

SEQUENCE LISTING OR PROGRAM

Not Applicable

BACKGROUND OF THE INVENTION

1. Field of Invention

This invention relates to optical periscopes with integrated video display capabilities.

2. Prior Art

Optical periscopes as described in U.S. Pat. No. 2,361,050 have been in use on ground combat vehicles such as tanks and infantry vehicles for many years. These periscopes are generally wide field of view devices composed mainly of solid glass or acrylic prisms with mirrored surfaces. A cross-section of a conventional periscope is shown in FIG. 1. The armor of the vehicle is represented by 170. Periscopes can be designed to be inserted from outside or inside the vehicle. The variety shown is inserted from the inside. The periscope is enclosed in a metal housing 130. A suitable elastic material such as a two-part Room Temperature Vulcanized (RTV) rubber 190 is used to secure and cushion the optics within the housing. Periscopes generally have an upper prism 110 and a lower prism 120 with reflective coatings on angled surfaces 115 and 125 respectively. The prisms are generally separated by gap 135 containing air, an inert gas, or a vacuum (U.S. Pat. No. 4,149,778), or a transparent elastic solid (U.S. Pat. No. 4,065,206). The purpose of the gap is to isolate the lower prism 120 from the shock of a ballistic impact on the upper portion of the periscope. Frequently there is a laser filter 140, which can be placed as shown at the entrance face, in the air gap, or at the exit face. The function of the filter is to protect the crewmember's eyes from laser damage while using the periscope. A protective faceplate 150, commonly composed of polycarbonate or other transparent shatter-resistant material, is often placed at the exit face of the periscope to prevent pieces of shattered glass or acrylic from entering the crew compartment in the event of a ballistic impact on the periscope. Light 180 from outside of the vehicle enters the periscope at the entrance face, reflects off reflective coating 115, reflects off reflective coating 125, exits the periscope at the exit face, and is visible by the eye of the crewmember 160. Conventional periscopes are used by crewmembers to drive, acquire targets, maintain situational awareness, and perform similar tasks while staying within the protection of the vehicle's armor. Such periscopes often include a blind as described in U.S. Pat. No. 4,033,677 which blocks light inside the vehicle from exiting through the periscope where it could be detected by opposing forces.

The skills involved in operating a ground combat vehicle have historically been trained in a simulator or by live exercises. Over the last decade, significant research has been performed to develop the capability to perform virtual training using the actual vehicle but not requiring movement of the vehicle or firing of actual weapons. This capability is referred to as Embedded Training. For example, embedded gunnery training has been demonstrated in the Abrams Main Battle Tank and Bradley Infantry Fighting Vehicle wherein synthetic imagery was electronically injected into the Forward Looking Infrared (FLIR) sights and the vehicle's controls were used by the crewmembers to engage the simulated targets. Noteworthy as these demonstrations were they underscored the limitations to current approaches to embedded training. Two major shortcomings were the inability to use the periscopes and other optical sights in the training and the inability to perform degraded mode training. The present invention addresses the optical sight shortcoming by integrating a display capability into the periscope.

In addition to enhancing embedded training capabilities a periscope with display capability can also be used as a general purpose display for displaying vehicle data or imagery from sensors or cameras during combat operations or vehicle maintenance functions.

The invention of U.S. Pat. No. 4,672,435 describes an array of displays placed in a circular pattern around the observer for displaying the imagery from a camera mounted in the proper azimuth position on a rotating platform. This method of displaying imagery has the intrinsic problem of introducing displays into an already space constrained vehicle compartment.

The invention of U.S. Pat. No. 5,982,536 improves upon the concept of U.S. Pat. No. 4,672,435 by integrating the display with the periscopes. However, the integration is by static combiner elements which inevitably involve compromises in performance. Specifically, a large portion of the outside light is lost when the device is used to provide an optical view of the outside world and a large portion of the display light is wasted when the device is used to provide a display image.

U.S. Pat. No. 6,844,980 describes an invention in which an electronically controllable image combiner is used to superimpose a display image in the user's line of sight when the combiner is in one electrical state and allow the user to see through the combiner when in another electrical state. However, this invention is defined as a thin substrate positioned generally normal to the direction of the user's line of sight, rather than being integrated into a periscope. Though this approach is an improvement over the static combiner method, it has inherent issues in that power must be continually applied when the image combiner capability is utilized and when power is removed, intentionally or through power failure, the combiner will cause the view to be degraded.

The invention of U.S. Pat. No. 7,056,119 is designed to provide an electronically controllable combination of images within a periscope through the use of electronic shutters and presumably static image combiners. As with the other inventions it too has intrinsic shortcomings, two of which are significant. First, the Polymer Dispersed Liquid Crystal (PDLC) technology used in the invention requires power to make it transparent, which is required when the outside view is desired. This implies that the device must be continuously powered in order for the crewmember to use the periscope in normal operation mode and that the loss of power will make the periscope unusable. The second failing is that the invention relies on Total Internal Reflection (TIR) and the elimination thereof by electronic means. Unfortunately the angles of incidence required to produce TIR do not permit the large field of view generally required of ground vehicle periscopes.

3. Objects and Advantages

Several objects and advantages of the present invention are:

a) provides for switching between outside view, display view, and a combination of the two within a periscope;
b) display view can be used to show a simulated scene for training purposes;
c) display view can be used to show vehicle data;
d) display view can be used to show video, e.g., from a daylight camera or FLIR;
e) combined view can be used to simultaneously show vehicle data and the outside view;
f) combined view can be used to simultaneously show symbology that is spatially correlated with the outside view (e.g., a target cue) and the outside view itself;
g) combined view can be used to simultaneously show sensor imagery (e.g., from a FLIR) in, for example, low light, obscuring weather, or obscuring smoke viewing conditions;
h) makes efficient use of space;
i) wastes very little of the outside or display light;
j) contains no moving parts which could wear out or jam;
k) failure modes return the device to the optical view of the outside;
l) design can be easily adapted to different size periscopes;
m) provides wide viewing angles;
n) can be permanently installed and used for both training and normal operations;
o) provides optional dimming of outside view;

SUMMARY

The present invention is a periscope that can be switched between the conventional optical view of the outside, a display image, and a combined (or overlay) view. The image switching is accomplished by a device with primarily reflective, primarily transparent, and intermediate states depending on the applied electrical potentials.

DRAWINGS

Figure 7A:
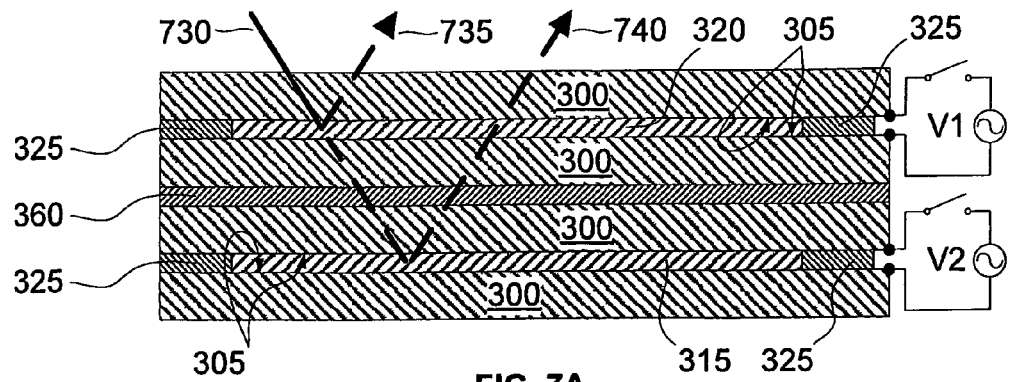
Figure 7B:
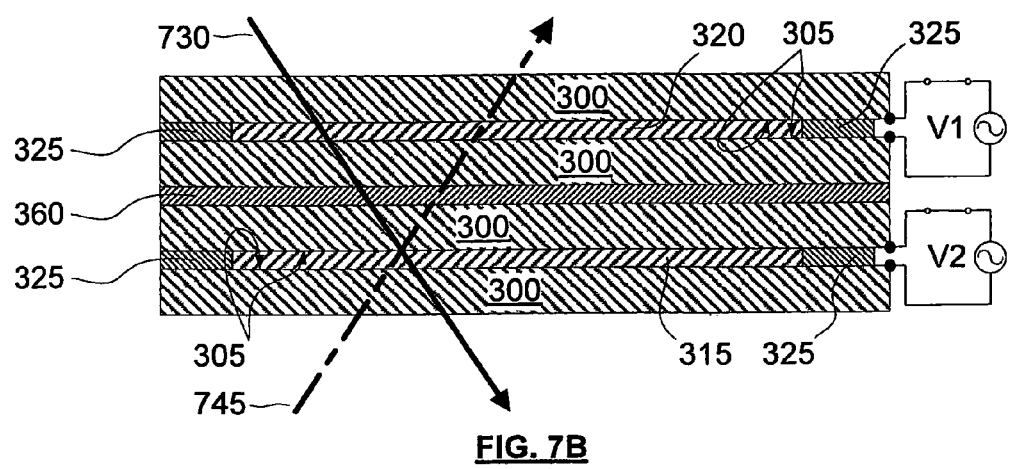
Figure 7C:
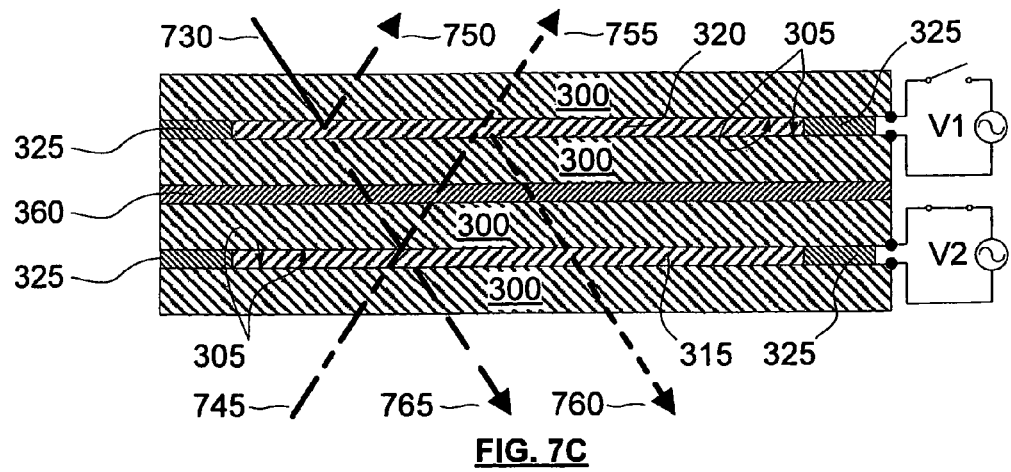

FIG. 7A, FIG. 7B, and FIG. 7C demonstrate the operation of the CLC ESM.

Figure 8:
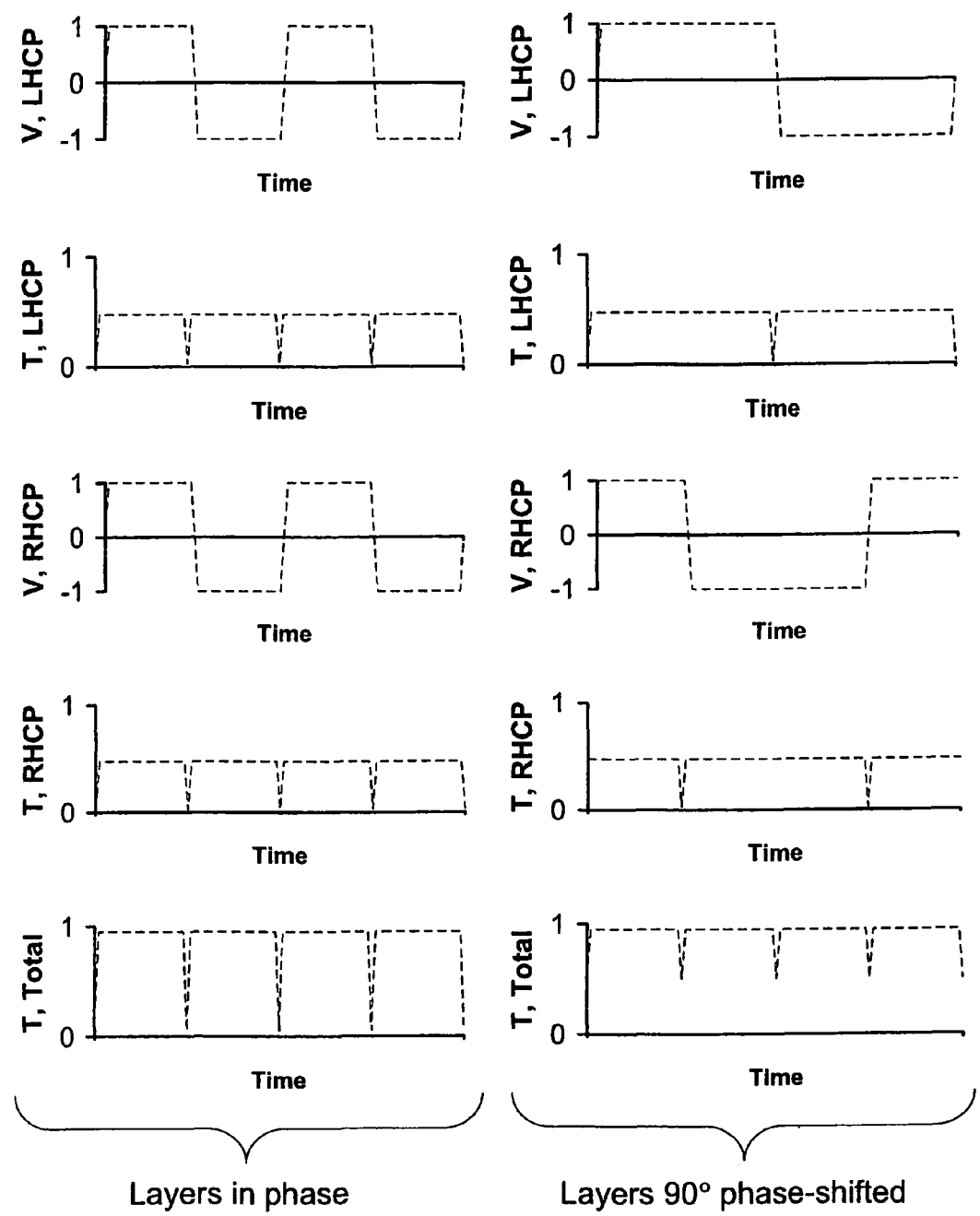

FIG. 8 shows plots of applied electrical potential and light transmission of the CLC ESM in its various states with in-phase and phase-shifted electrical drive schemes.

Figure 9:
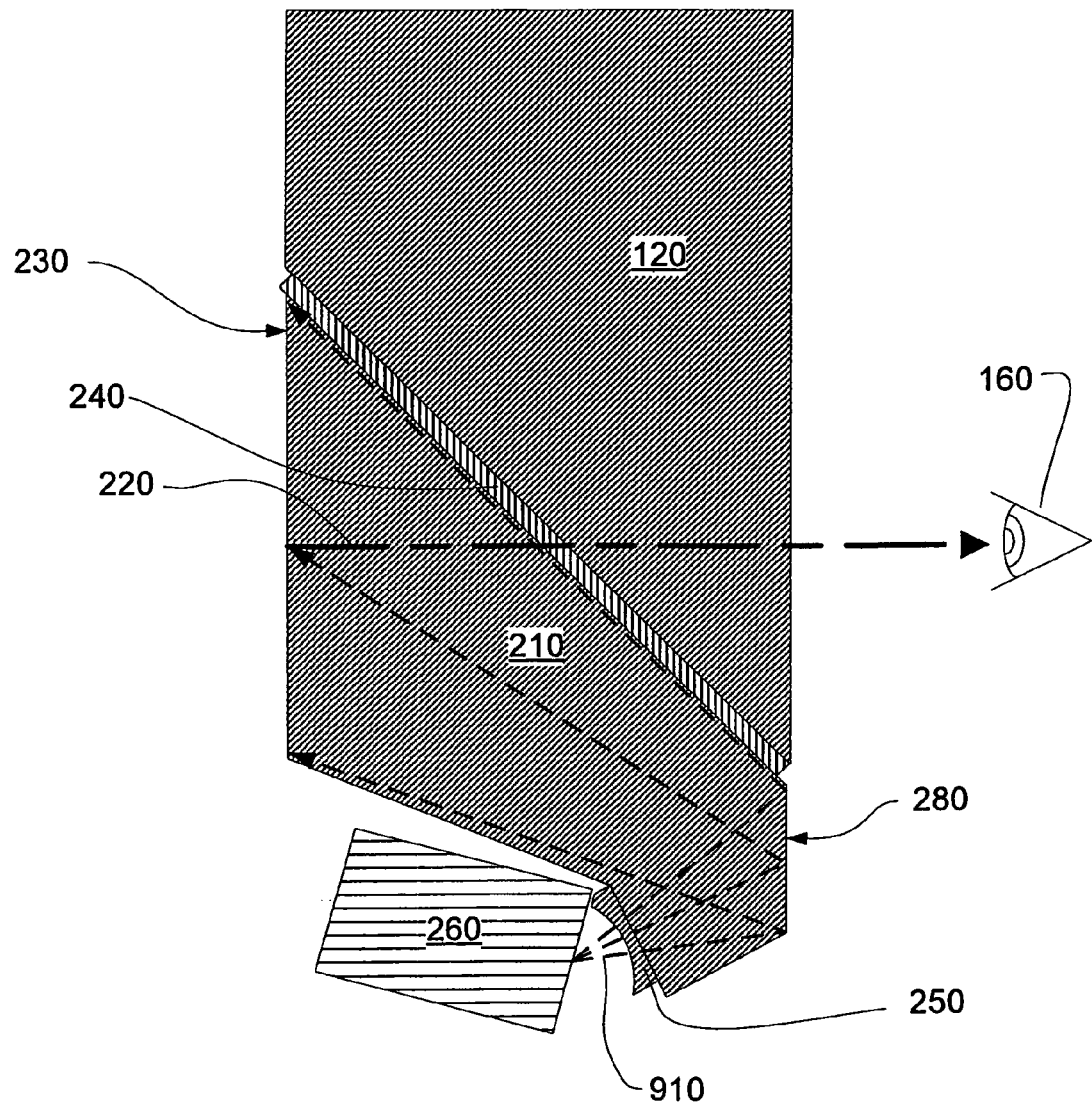

FIG. 9 shows the projection path.

Figure 10:
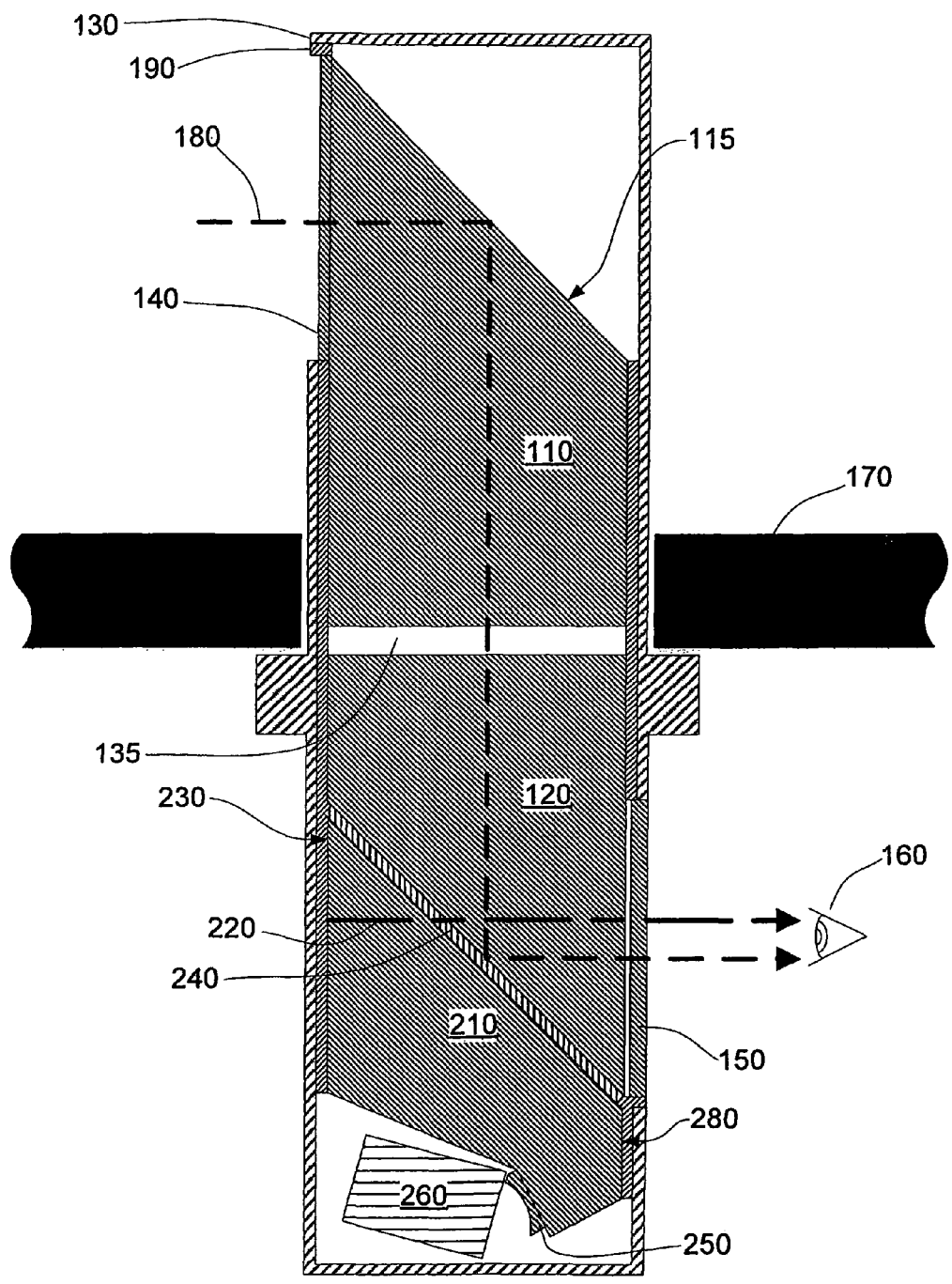

FIG. 10 shows a variant of the present invention with only one ESM.

Figure 11:
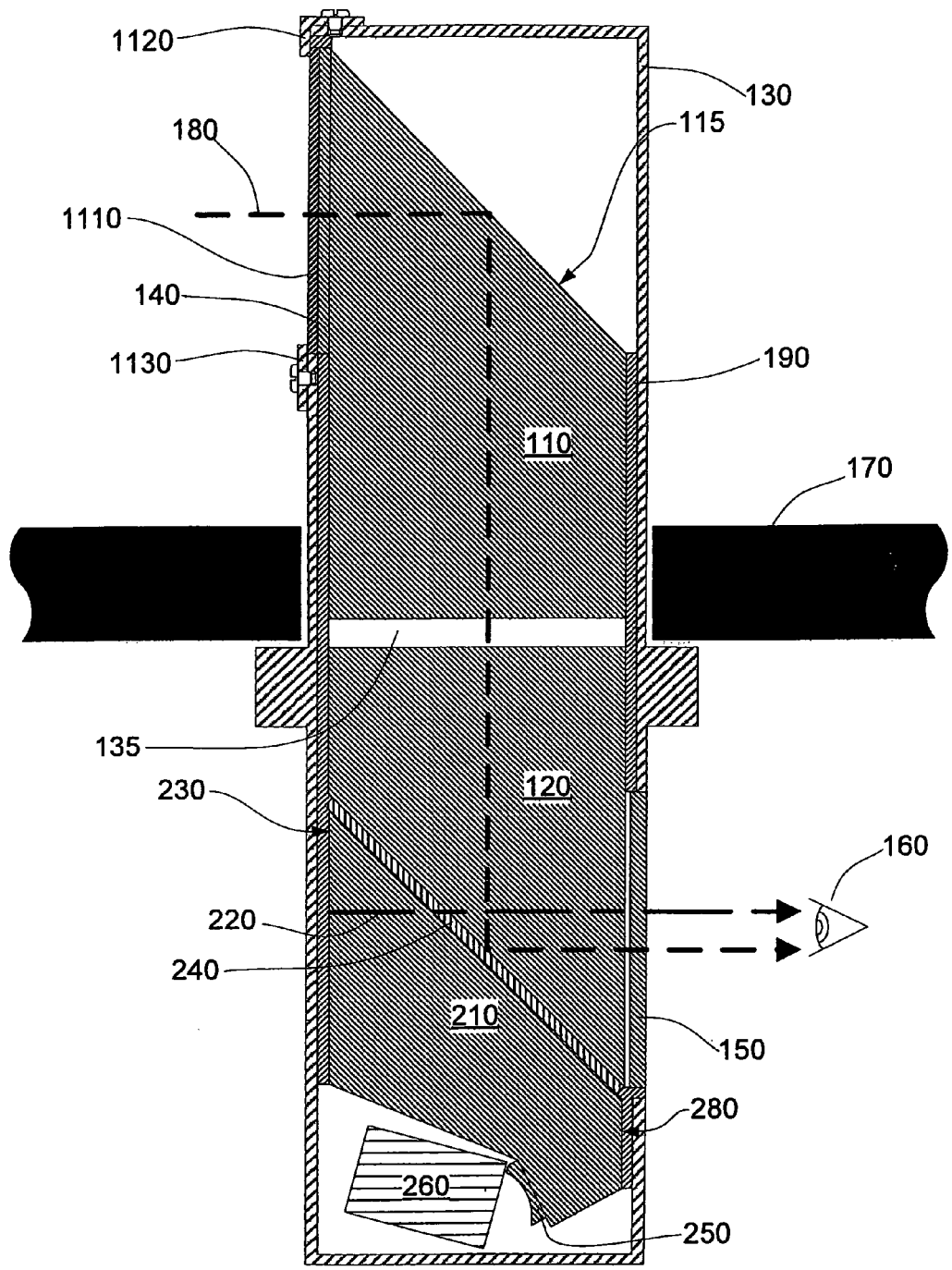

FIG. 11 shows a variant of the present invention with one ESM and one Electronically Switchable Shade (ESS).

Figure 12:
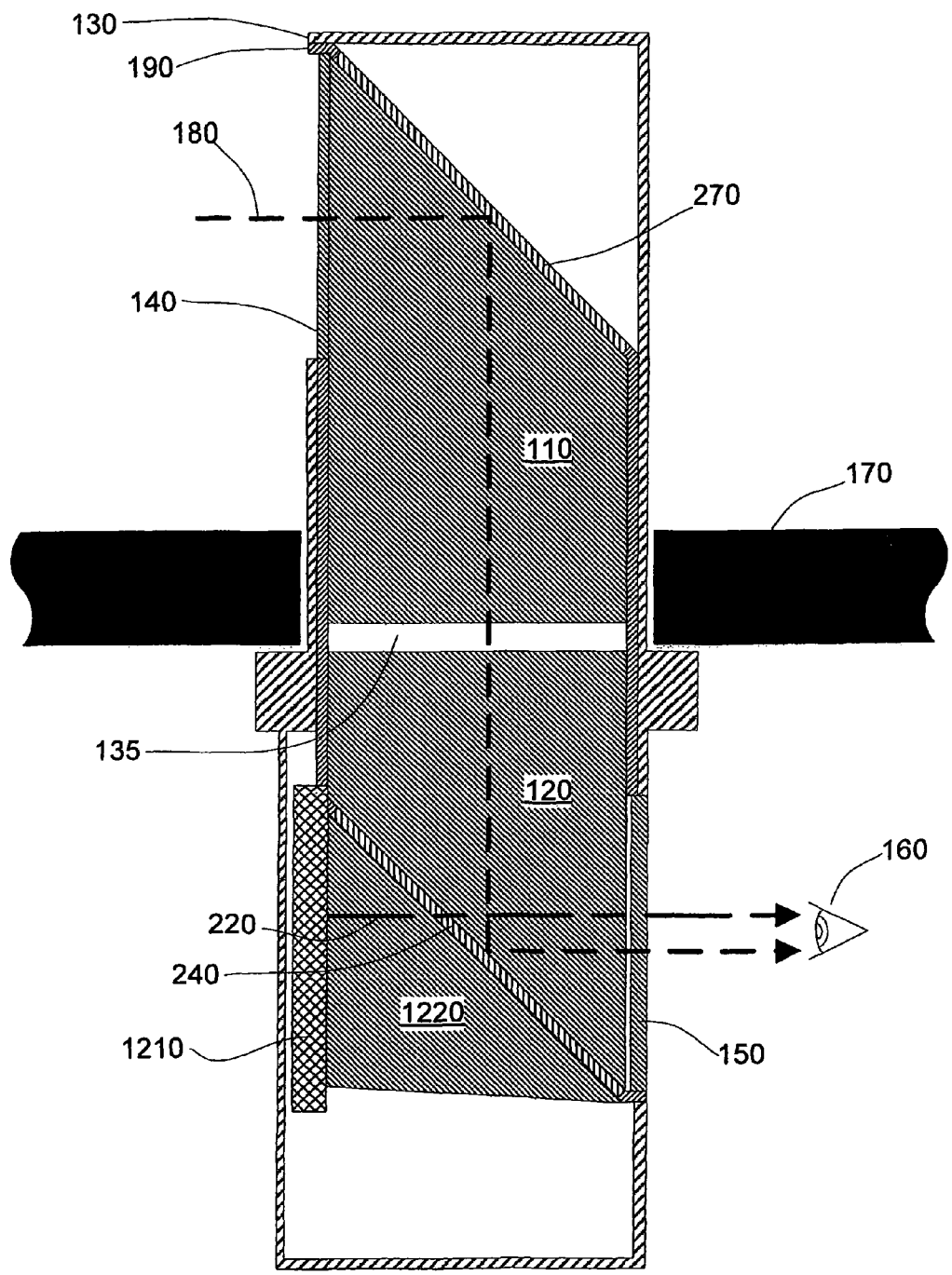

FIG. 12 shows a variant of the present invention with a Flat Panel Display (FPD).

Figure 13:
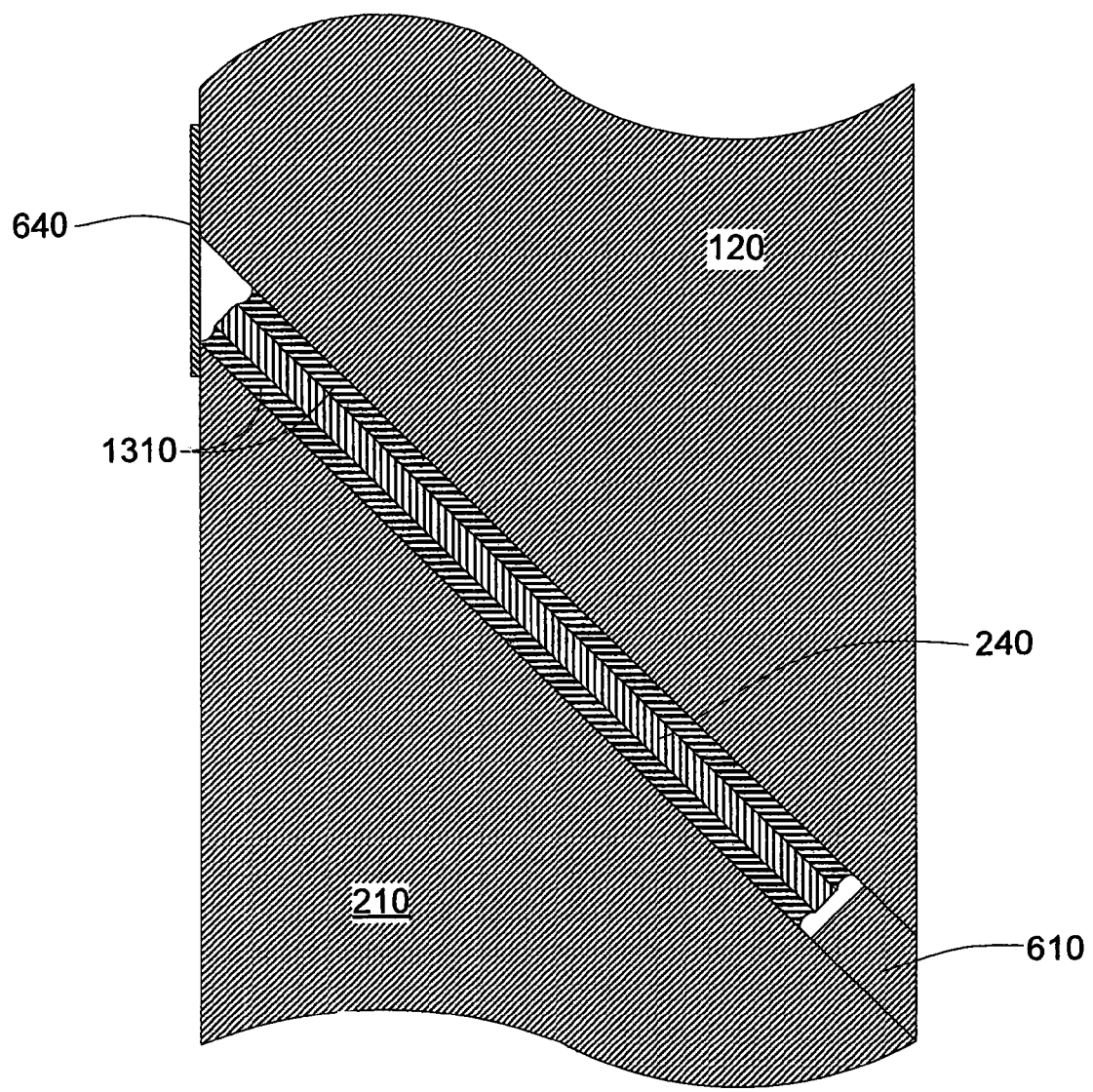

FIG. 13 shows an alternative lower ESM mounting.

DETAILED DESCRIPTION

Preferred Embodiment

Figure 1:
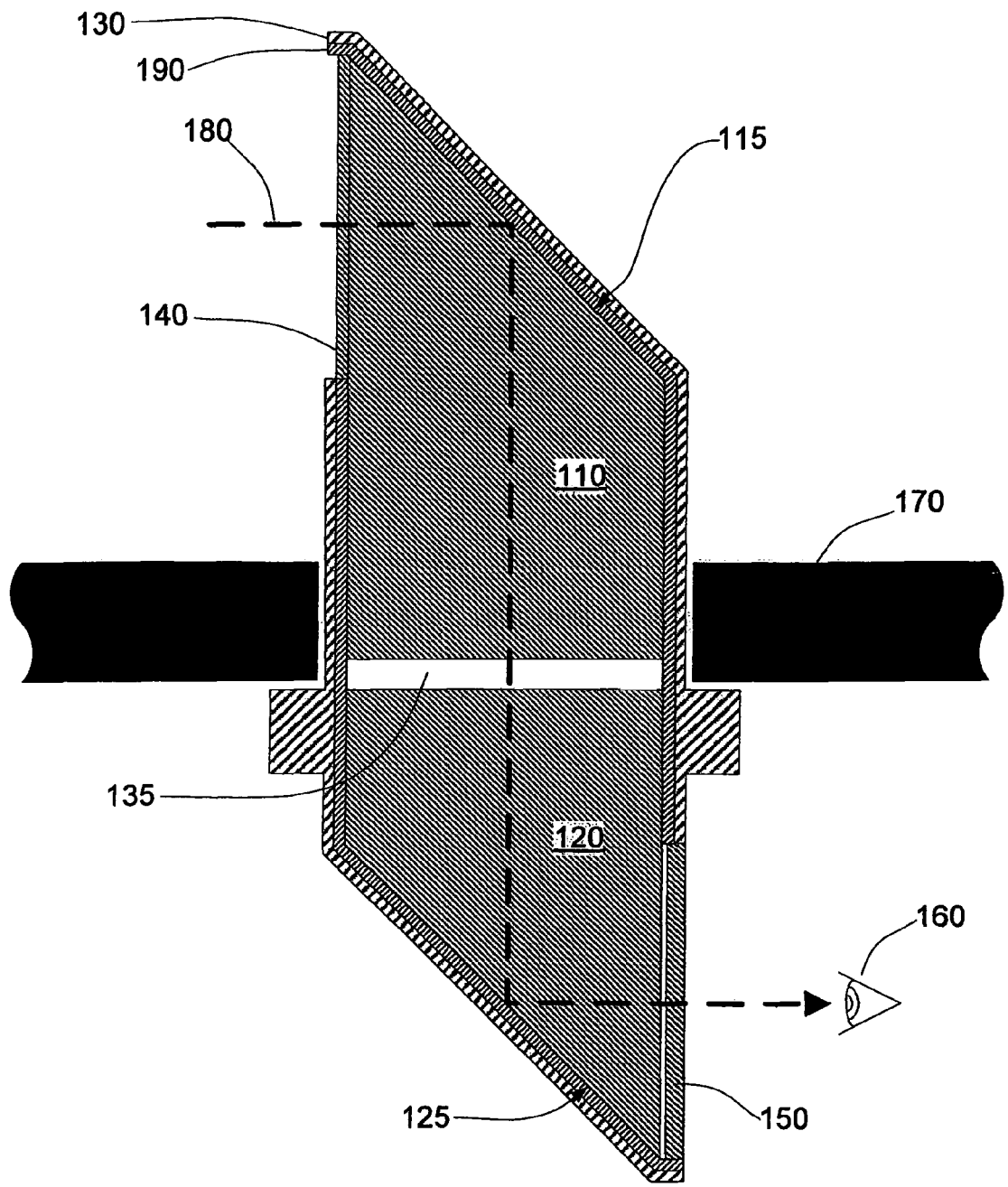
FIG. 1 shows a cross-section view of a prior art periscope.
Figure 2:
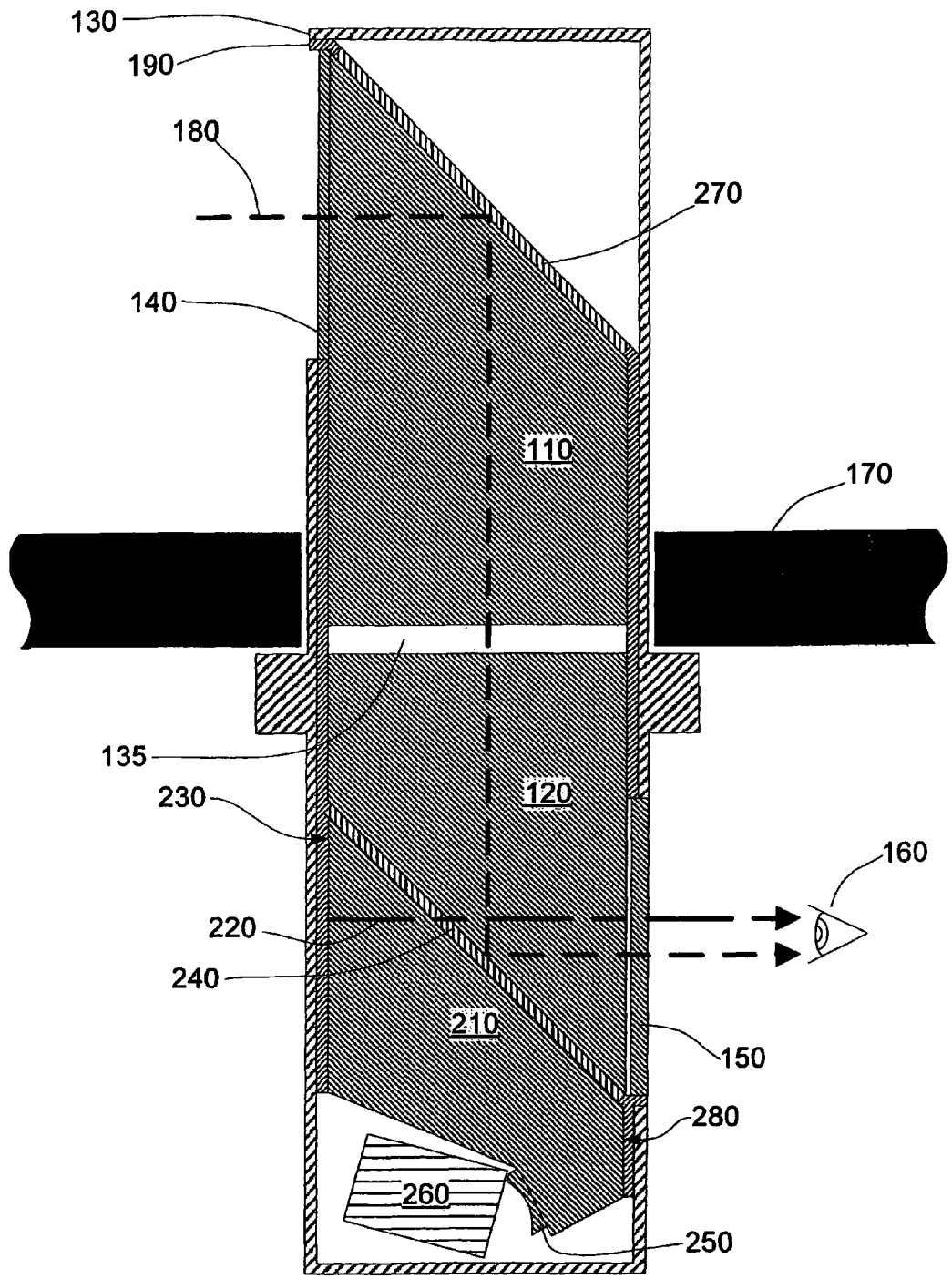
FIG. 2 shows a cross-section view of the preferred embodiment of the present invention.

The preferred embodiment of the present invention is shown in FIG. 2. The present invention includes many of the same components as the prior art periscope with several changes and additions. Projection prism 210 is added behind and below lower prism 120. The reflective coating on the angled face of the lower prism is replaced with lower Electronically Switchable Mirror (ESM) 240. The reflective coating of upper prism 110 has been replaced by upper ESM 270. The ESM is composed of two layers, each a Cholesteric Liquid Crystal (CLC) device as described in U.S. Pat. No. 6,674,504. One layer has a right-handed helix structure and reflects Right-Handed Circularly Polarized (RHCP) light. The other has a left-handed helix structure and reflects Left-Handed Circularly Polarized (LHCP) light. Projection screen coating 230 is applied to the indicated surface of projection prism 210. Projection screen coating 230 can be a paint intended for that purpose and widely available or some other suitable coating. Reflective coating 280 is applied to one surface of projection prism 210. Reflective coating 280 could be aluminum or other suitable coating. Projection lens 250 is glued to projection prism 210 using an appropriate clear adhesive such as an Ultra Violet (UV) curing epoxy. Projector 260 is mounted with the projection origin at the center of curvature of projection lens 250 and oriented so that the projected light enters projection lens 250. Housing 130 has been expanded to enclose these added components and provide space for the necessary electronics. Space for electronics is available above and to the right of upper ESM 270 and below projection prism 210. The exact size and shape of housing 130 will depend on the amount of space required for support electronics and the location of available space in the vehicle in the vicinity of the periscope.

Figure 3:
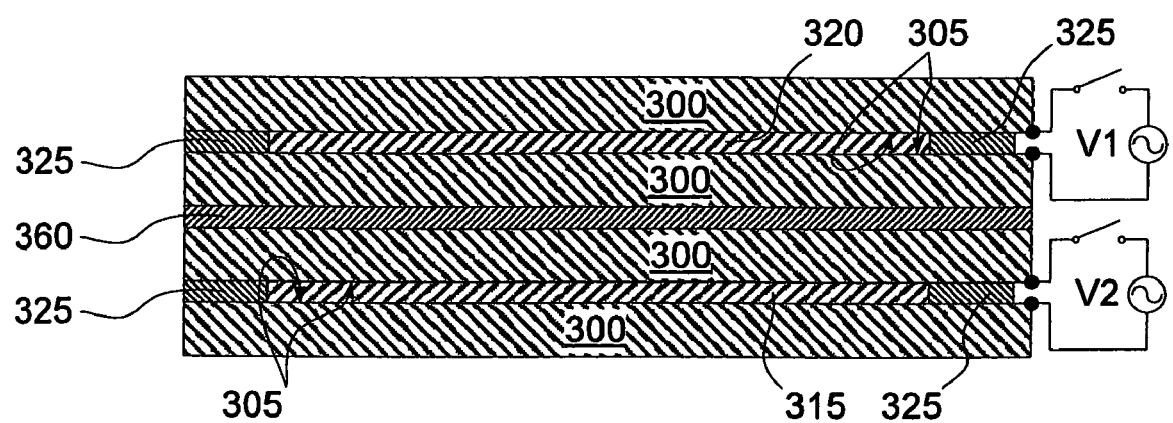
FIG. 3 shows cross-section views of the Cholesteric Liquid Crystal (CLC) Electronically Switchable Mirror (ESM).

FIG. 3 shows a cross-section of the Cholesteric Liquid Crystal (CLC) Electronically Switchable Mirror (ESM). The thicknesses of the different layers are not to scale to simplify the figure. The ESM consists of four glass substrates 300, each with transparent electrically conductive coating 305 composed of a material such as Indium Tin Oxide (ITO). Power sources V1 and V2 with switches are connected to transparent electrically conductive coatings 305. Layers of CLC material 320 and 315 are injected between pairs of the substrates. CLC layer 320 has a left-handed helical structure in its normal state. CLC layer 315 has a right-handed helical structure in its normal state. Such CLC helical structures have the property of reflecting circularly polarized light of the same handedness and of a wavelength corresponding to the pitch of the helix. The helical structures of CLC layers 320 and 315 vary in pitch through the thickness of the layer such that the full spectrum of visible light is reflected. A suitable transparent adhesive 325 such as UV-curing epoxy is used to seal the edges of the CLC layers. A similar transparent adhesive 360 is used to bond the inner substrates together.

Figure 4A:
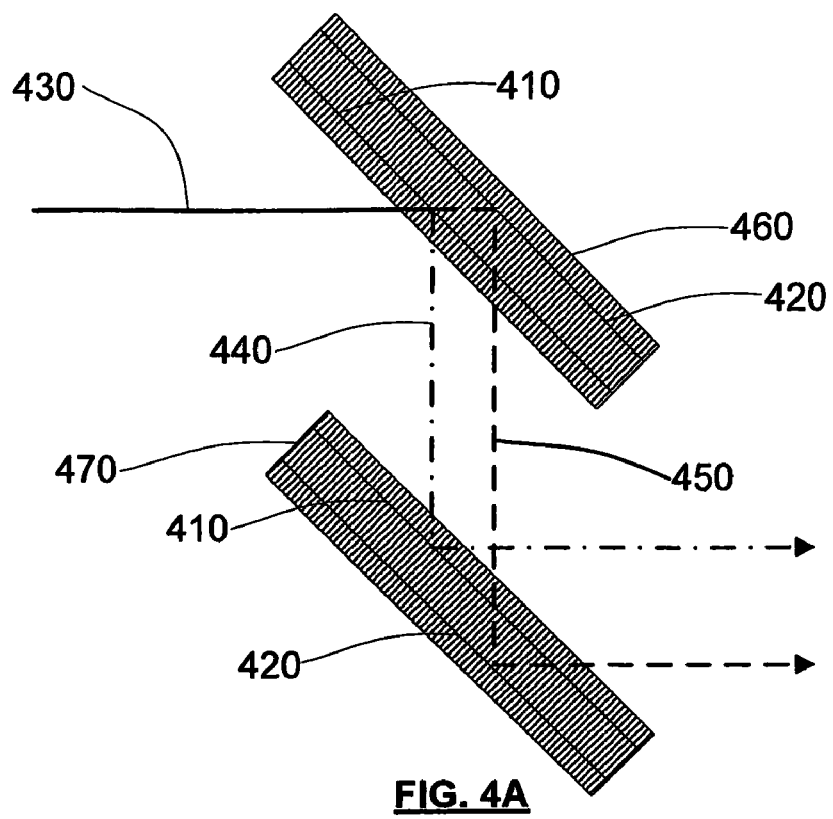
FIG. 4A and FIG. 4B show the effect of CLC ESM layer orientation on the double image issue.
Figure 4B:
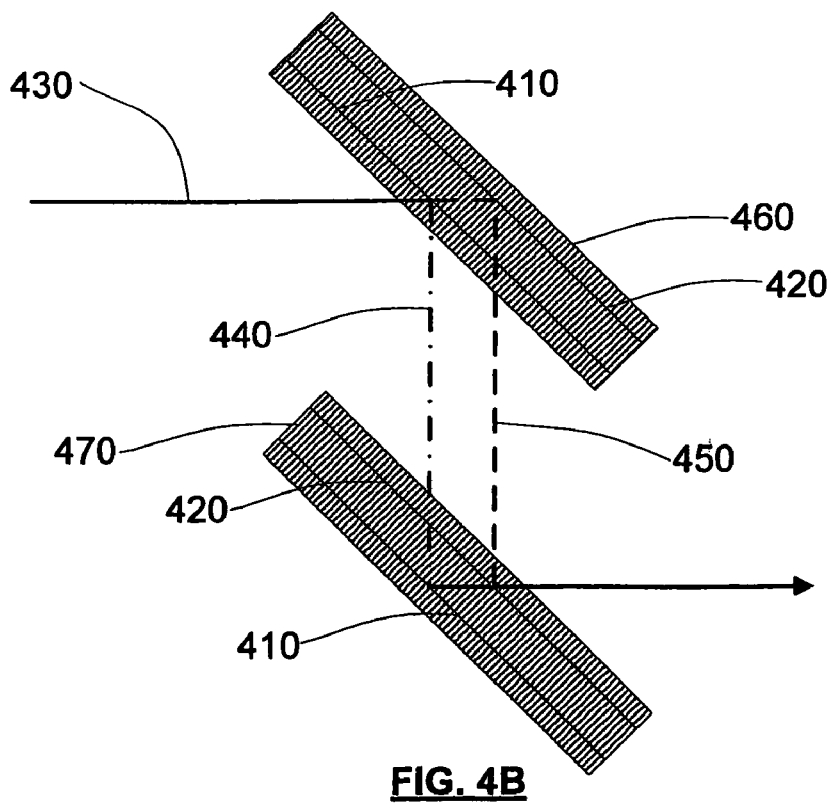

FIG. 4A and FIG. 4B depict the issue of a double image produced during conventional outside view mode due to the ESM being composed of two layers separated by a distance approximately twice the thickness of the substrates. Only the CLC ESMs and light rays are shown to simplify the figure. FIG. 4A represents the case in which the two CLC ESMs are oriented with their LHCP CLC layers 410 towards each other. The incident unpolarized ray of light 430 hits upper ESM 460 and most of the LHCP light is reflected by LHCP CLC layer 410 as represented by ray 440. The remaining light continues until it hits RHCP CLC layer 420 where the majority of the remaining light is reflected as represented by ray 450. The two rays 440 and 450 are now spatially separated by a distance approximately equal to the distance between the CLC layers divided by the cosine of the angle of incidence. Likewise, the two separate beams of light hit the two layers of lower ESM 470 where they are again reflected. This second reflection doubles the spatial offset of the two rays.

FIG. 4B represents the case in which the two CLC ESMs are oriented with the LHCP CLC layer 410 of one toward the RHCP CLC layer 420 of the other. The incident unpolarized ray of light 430 is split into two spatially offset rays due to the reflection off the two layers of the upper ESM as in FIG. 4A. However, the reversed orientation of the lower ESM causes the spatial offsets from the upper and lower ESMs to cancel each other out. FIG. 4B depicts the arrangement used in the preferred embodiment of the invention.

Figure 5:
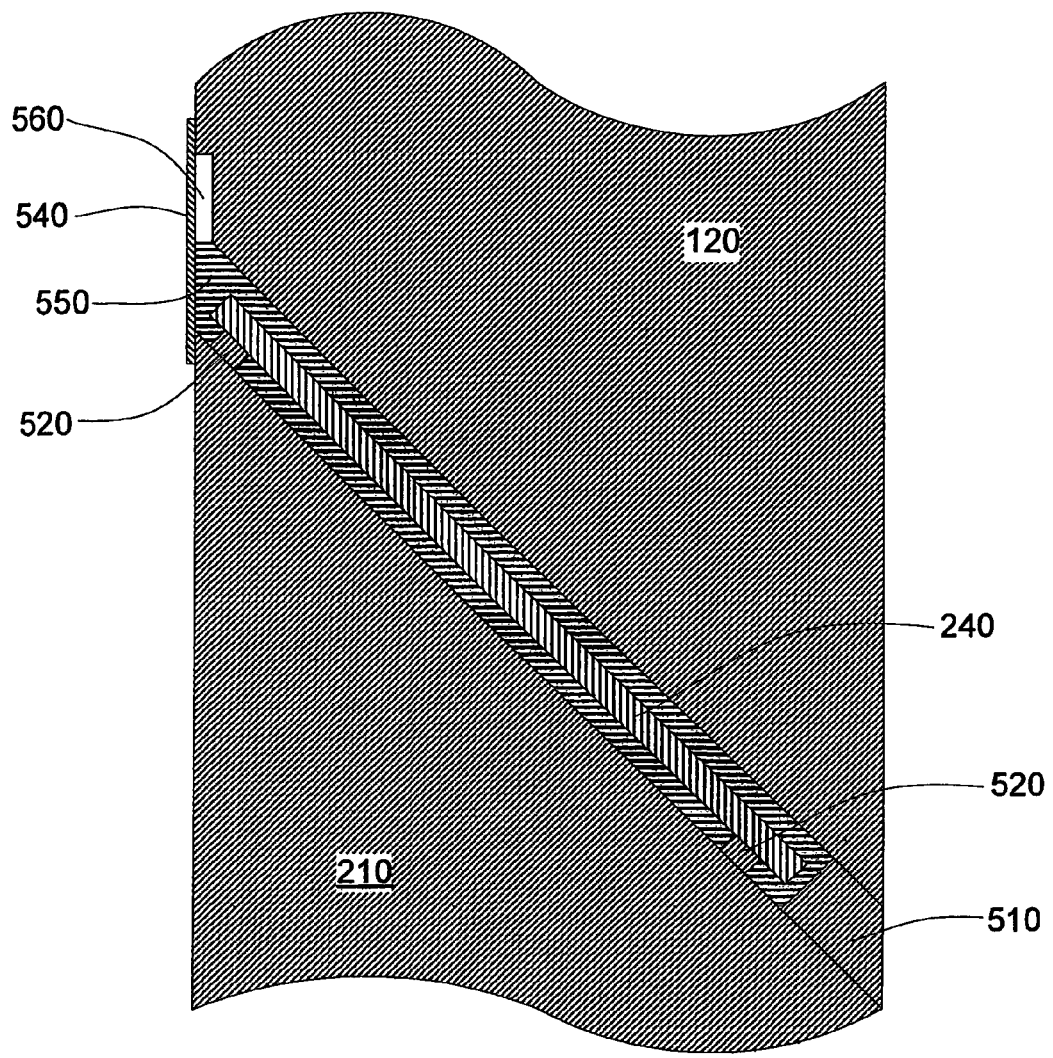
FIG. 5 shows the lower ESM mounting.

FIG. 5 is a side cross-section view of just the area of the lower ESM and depicts the lower ESM mounting method for the preferred embodiment of the invention. Only the lower prism 120, projection prism 210, lower ESM 240, and the ESM mounting and sealing provisions are shown for clarity. Four glass or acrylic spacers 520 are glued to lower ESM 240 using a transparent adhesive such as UV-curing epoxy. The four glass spacers are in turn glued to projection prism 210 using the same transparent adhesive. Lower seal 510 and similar side seals (not shown) are glued to projection prism 210 using transparent adhesive and lower prism 120 is then glued to the side seals and lower seal 510 using transparent adhesive. The resulting cavity surrounding lower ESM 240 is then filled with optical fluid or gel 550 having an index of refraction that closely matches that of the prisms, ESM substrates, and spacers 520. The cavity is not completely filled such that air space 560 remains. The air space 560 is sized to allow optical fluid or gel 550 to expand due to temperature without increasing the pressure of the fluid above the strength of the seals. Upper seal 540, composed of stainless steel or other suitable material, is then glued in place with a suitable adhesive, sealing the optical fluid within the cavity. Optical fluid or gel 550 around lower ESM 240 prevents internal reflections and insulates lower ESM 240 from the prisms so that it can be heated to operating temperature more quickly. Since lower prism 120 is attached to projection prism 210 without being directly attached to lower ESM 240, the ESM is isolated from physical shocks and vibrations.

Figure 6:
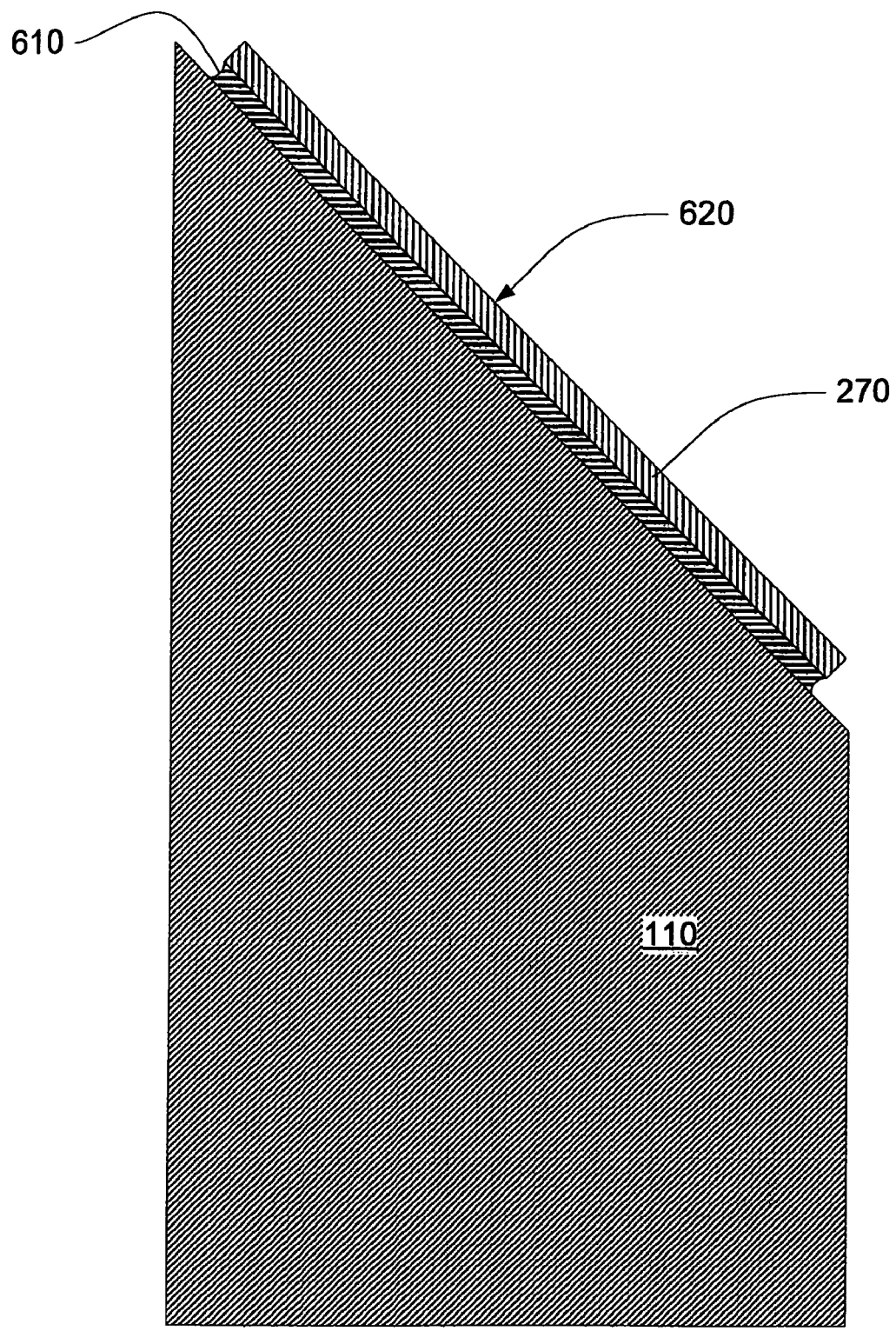
FIG. 6 shows the upper ESM mounting.

FIG. 6 is a side cross-section of just the area of the upper ESM and depicts the upper ESM mounting method for the preferred embodiment of the invention. Only the upper prism 110, upper ESM 270, and the ESM mounting provisions are shown for clarity. Since there is no prism on the upper side of upper ESM 270 with which an optical connection needs to be made, a simpler method can be used to mount the upper ESM. Upper ESM 270 is glued to upper prism 110 with a transparent adhesive 610 that is suitable for use in thick sections, has an index of refraction that closely matches that of the prism and ESM substrates, and is flexible. The flexibility of adhesive 610 allows it to adjust as upper prism 110 and upper ESM 270 expand differentially due to different coefficients of thermal expansion and uneven heating. The adhesive thickness is sized to allow sufficient differential thermal expansion and to insulate upper ESM 270 from upper prism 110 so it can be heated to operating temperature more quickly. A light-absorbing coating 620, such as black paint, is applied to upper ESM 270 to absorb light that is transmitted completely through the ESM.

OPERATION

Preferred Embodiment

FIG. 7A, FIG. 7B, and FIG. 7C show identical cross-sections of the Cholesteric Liquid Crystal (CLC) Electronically Switchable Mirror (ESM) in different states. FIG. 7A represents the reflective state of the CLC ESM. Both layers of the ESM are in their naturally reflective state as there is no applied electrical potential V1 or V2. The incident outside light 730 enters the CLC ESM and hits Left-Handed Circularly Polarized (LHCP) CLC layer 320 where the LHCP portion 735 is reflected. The remaining portion of the light continues until it hits Right-Handed Circularly Polarized (RHCP) CLC layer 315 where the RHCP portion 740 of the light is reflected. A small portion of the incident light is not reflected by either CLC layer but this is not shown in the figure.

FIG. 7B represents the transparent state of the ESM. Both layers of the ESM are in their transparent state due to the application of electrical potentials V1 and V2. The electrical potential creates an electromagnetic field normal to the substrate surface and the liquid crystal particles align with that field, disrupting the helical structure which normally produces reflection. Incident outside light 730 passes completely through the CLC ESM. Incident light 745 from the display also passes completely through the CLC ESM.

FIG. 7C represents the intermediate state of the ESM. LHCP CLC layer 320 is reflective due to the lack of an electrical potential V1. RHCP CLC layer 315 is transparent due to the application of an electrical potential V2. The LHCP portion 750 of the incident outside light 730 is reflected by LHCP CLC layer 320 while the RHCP portion 765 passes completely through the ESM. RHCP portion 755 of the incident display light 745 passes through the ESM while the LHCP portion 760 is reflected by LHCP CLC layer 320.

Lower ESM 240 and upper ESM 270 from FIG. 2 can each be switched between a primarily reflective state, a primarily transparent state, and an intermediate state, represented by FIG. 7A, FIG. 7B, and FIG. 7C respectively. When lower ESM 240 and upper ESM 270 are both in the reflective state represented by FIG. 7A, the periscope operates as a conventional prior art periscope, providing an optical view of the outside represented by light ray 180 in FIG. 2. When lower ESM 240 and upper ESM 270 are both in the transparent state represented by FIG. 7B, the periscope provides a display view represented by light ray 220 in FIG. 2. When upper ESM 270 is in the reflective state represented by FIG. 7A and lower ESM 240 is in the intermediate state represented by FIG. 7C, the periscope provides a combined view of both the outside represented by light ray 180 in FIG. 2 and the display view represented by light ray 220 in FIG. 2. Approximately 50% of the light from each of the two views reaches the crewmember's eye 160. The purpose of upper ESM 270 is to reduce the residual amount of outside light that reaches the crewmember's eye when in display mode. For example, if a single ESM has a 5% residual reflection when it is in transparent mode, two ESMs in series will have a 0.25% total residual reflection. This is important as 5% of a bright outside light would significantly interfere with the display view.

The ESMs can also be used to dim the outside view in cases of bright ambient lighting conditions by, for example, making one layer of upper ESM 270 transparent. This will result in an approximately 50% reduction in brightness of the outside view. Likewise, in combined mode, one layer of upper ESM 270 can be made transparent to reduce the brightness of the outside portion of the view to equalize the brightness of these two components of the combined view.

The ESMs can also be used to block light originating inside the vehicle from passing through the periscope to the outside where it could be detected by enemy forces. To accomplish this, all ESM layers would be made transparent.

FIG. 8 shows plots of driving voltage V and the resulting optical transmission T for the LHCP and RHCP layers of the ESM and the resulting total optical transmission T for the two layers together. All values are normalized to 0 to 1 or −1 to +1 scales. Direct current power will cause the CLC ESM to switch but will eventually result in degradation of the device due to migration of particles to either the plus or minus electrode. Therefore, an alternating current is used. A square wave is preferred over a sine wave as optical transmission of the ESM is related to the voltage and a square wave has a greater average absolute value voltage level compared to a sine wave of the same peak voltage value. The plots in the left column represent the case where the two layers of the ESM are driven by identical square waves. The plot at the bottom left represents the total optical transmission for the two layers together. Note that at each voltage transition, the total optical transmission dips significantly. This effect is noticeable to the user as a visible flicker when the square wave frequency is less than approximately 60 Hz.

The plots in the right column represent the case where the LHCP and RHCP layers of the ESM are driven at half the frequency but with a phase offset of 90 degrees. The resulting total optical transmission, in the lower right plot, has the same visual frequency from half the square wave frequency and the magnitude of the dip in optical transmission is also half. Power consumption of a layer of the CLC ESM is approximately proportional to the square wave frequency. Therefore, 90 degree phase shifted 30 Hz square wave inputs produce the same or better visual effect with approximately half the power consumption of in-phase 60 Hz square wave inputs. This scheme is used in the preferred embodiment of the invention. Several methods for producing the described phase-shifted square wave are well known to those knowledgeable in the art.

FIG. 9 shows a cross-section of just the area of the projection path. Projection rays 910 are emitted by projector 260, enter projection prism 210 via projection lens 250, reflect off mirrored surface 280, and are diffusely reflected by projection screen 230. The image projected on projection screen 230 is then visible to the eye of the crewmember 160. The three depicted rays of projection rays 910 represent the upper and lower extents of the projected image and the midpoint. Projection image ray 220 represents a single ray of light from a single pixel of the projected image. A front projection system is shown but rear projection, where the light is projected onto the side of the projection screen away from the viewer, is also possible.

Alternative Embodiments

FIG. 10 represents an alternative embodiment in which the upper ESM has been removed and replaced by reflective coating 115 on the angled surface of upper prism 110. This embodiment has the advantage of easier assembly and lower cost but requires that the remaining lower ESM 240 have a much smaller residual reflection when in transparent mode.

FIG. 11 represents an alternative embodiment in which the upper ESM has been removed and replaced by reflective coating 115 on the angled surface of upper prism 110 and Electronically Switchable Shade (ESS) 1110 has been added. The ESS has the property of being transparent or opaque depending on the applied electrical potential. AlphaMicron, Inc. in Kent, Ohio is one available source for such a device which they term Variable Attenuation Liquid Crystal Device (VALiD) which is used, for example, in ski goggles with electronically variable light attenuation. AlphaMicron's devices have the desired behavior of being clear when no power is applied. ESS 1110 can be placed at the entrance face as shown in FIG. 11 or it can be placed in air gap 135. Retaining brackets 1120 and 1130 are used to hold ESS 1110 in place. Upper ESM 270, from FIG. 2, which must be optically coupled to the upper prism 110 and is therefore difficult to replace in case of failure, is eliminated. ESS 1110 does not need to be optically coupled to upper prism 110 so it is more easily removed and can be located in a place with easier access for maintenance. A suitable device for ESS 1110 should be substantially transparent with the power off and be capable of blocking on the order of 90% of the light when power is on.

FIG. 12 represents an alternative embodiment in which the projector, projection screen, and projection lens have been eliminated and replaced with Flat Panel Display (FPD) 1210. The projection prism has been replaced with alternative display prism 1220. FPD 1210 could be a Liquid Crystal Display (LCD), Organic Light-Emitting Diode (OLED), or other suitable technology. This embodiment has the disadvantage of greater space claim in the area of the FPD but the advantage of the elimination of space claim where the projector was located in FIG. 2. Depending on the application, more space may be available in one location than the other.

Either of the two different methods of mounting the upper and lower ESMs shown in FIG. 5 and FIG. 6 could be used on either ESM. FIG. 13 represents an alternative embodiment wherein lower ESM 240 is mounted using a modification of the method shown in FIG. 6 for the upper ESM. Lower ESM 240 is mounted to both lower prism 120 and display prism 210 with the same flexible adhesive 1310. In addition, a stiffer structural connection between the two prisms is made with metal seal 640 or glass seal 610 or a combination thereof. The bulk of the shock forces are borne by the stiffer seals 640 and 610, thereby isolating lower ESM 240 from high shock forces. This alternative embodiment eliminates the possibility of leakage of the optical fluid cavity as in the preferred embodiment while still providing the necessary thermal and shock isolation features.

Two alternatives to a CLC ESM are an electrochromic ESM such as is described in U.S. Pat. No. 5,905,590 or an electrochemical ESM such as is described in U.S. Pat. No. 5,923,456. Such devices would also be composed of transparent substrates with transparent electrode coatings with an active material between. Such devices could be mounted in the same manner as has been described for the CLC ESM.

Conclusion, Ramifications, and Scope

Accordingly, the reader will see that the multi-purpose periscope of this invention can be used to provide display and combined view modes in addition to the normal outside view of a conventional periscope. The display mode can be used to inject a simulated view into the periscopes for embedded training, display video from daylight or FLIR cameras, display a map, or present any other video-based information. The combined mode can be used to overlay vehicle data, target indicators, lane markers, etc onto the outside view. The invention can also be used to provide dimming of the outside view in the event of very bright ambient lighting conditions. The device has no moving parts that could wear out and fail. Any electronic failures would still allow use in the most critical mode: the outside view mode.

While the above description contains many specifics, these should not be construed as limitations on the scope of the invention. For example, the projector could be positioned in a variety of locations; the various ESM technologies could be used in various combinations and arrangements; etc

We claim:

1. A periscope, said periscope comprising:
a housing;
an upper prism arranged within a top portion of an interior of said housing;
a lower prism arranged adjacent to said upper prism in said interior of said housing;
a projection prism arranged adjacent to said lower prism;
a projection screen coating arranged on a surface of said projection prism;
a projector arranged adjacent to said projection prism; and
an electronically switchable mirror arranged on an angled face of said lower prism.

2. The periscope of claim 1 further comprising an electronically switchable shade arranged at an entrance face of the periscope.

3. The periscope of claim 1 further comprising an electronically switchable shade arranged in a gap between said upper prism and said lower prism.

4. The periscope of claim 1 wherein said projection prism having a reflective coating on a surface thereof.

5. The periscope of claim 1 further comprising a second electronically switchable mirror arranged on an angled surface of said upper prism.

6. The periscope of claim 1 further comprising a gap between said upper prism and said lower prism.

7. The periscope of claim 1 further comprising a projection lens arranged between said projection prism and said projector.

8. A periscope, said periscope comprising:
a housing;
an upper prism arranged within a top portion of an interior of said housing;
a lower prism arranged adjacent to said upper prism in said interior of said housing;
a projection prism arranged adjacent to said lower prism;
a projector arranged adjacent to said projection prism;
an electronically switchable mirror arranged on an angled face of said lower prism; and
a protective faceplate arranged at an exit face of the periscope.

9. A periscope, said periscope comprising:
a housing;
an upper prism arranged within a top portion of an interior of said housing;
a lower prism arranged adjacent to said upper prism in said interior of said housing;
a projection prism arranged adjacent to said lower prism;
a projector arranged adjacent to said projection prism;
an electronically switchable mirror arranged on an angled face of said lower prism; and
a filter arranged at an entrance face of the periscope.

10. A periscope, said periscope comprising:
a housing;
an upper prism arranged within a top portion of an interior of said housing;
a lower prism arranged adjacent to said upper prism in said interior of said housing;
a projection prism arranged adjacent to said lower prism;
a projector arranged adjacent to said projection prism;
an electronically switchable mirror arranged on an angled face of said lower prism; and
a seal or cushioning member arranged between an inside surface of said housing and said optics.

11. A periscope, said periscope comprising:
a housing;
an upper prism arranged within a top portion of an interior of said housing;
a lower prism arranged adjacent to said upper prism in said interior of said housing;
a projection prism arranged adjacent to said lower prism;
a projector arranged adjacent to said projection prism;
an electronically switchable mirror arranged on an angled face of said lower prism;
an electronically switchable shade arranged at an entrance face of the periscope; and
retaining brackets secured to said housing, said retaining brackets contact and secure said electronically switchable shade at said entrance face of the periscope.

12. A periscope, said periscope comprising:
a housing;
an upper prism arranged within said housing;
a lower prism arranged adjacent to said upper prism;
a gap between said upper prism and said lower prism, and a gap or cushioning member arranged between an inside surface of said housing and said optics;
a display prism arranged adjacent to said lower prism;
a flat panel display arranged between an inside surface of said housing and a surface of said display prism; and
an electronically switchable mirror arranged on an angled surface of said lower prism.

13. The periscope of claim 12 wherein said upper prism having a reflective coating arranged on an angled surface thereof.

14. The periscope of claim 12 wherein said upper prism having a reflective coating arranged on a top surface thereof.

15. A periscope, said periscope comprising:
a housing;
an upper prism arranged within said housing;
a lower prism arranged adjacent to said upper prism;
a display prism arranged adjacent to said lower prism;
a flat panel display arranged between an inside surface of said housing and a surface of said display prism;
an electronically switchable mirror arranged on an angled surface of said lower prism; and
a protective faceplate arranged at an exit face of the periscope.

16. A periscope, said periscope comprising:
a housing;
an upper prism arranged within said housing;
a lower prism arranged adjacent to said upper prism;
a display prism arranged adjacent to said lower prism;
a flat panel display arranged between an inside surface of said housing and a surface of said display prism;
an electronically switchable mirror arranged on an angled surface of said lower prism; and
a filter arranged at an entrance face of the periscope.

17. The periscope of claim 12 wherein said flat panel display is a liquid crystal display (LCD).

18. The periscope of claim 12 wherein said flat panel display is an organic light emitting diode (OLED) display.

19. The periscope of claim 12 further comprising an electronically switchable shade arranged at an entrance face of the periscope.

20. The periscope of claim 12 further comprising an electronically switchable shade arranged in a gap between said upper prism and said lower prism.

21. The periscope of claim 12 further comprising a second electronically switchable mirror arranged on a surface of said upper prism.

* * * * *